United States Patent
Dien-Barataud et al.

(10) Patent No.: US 8,399,376 B2
(45) Date of Patent: Mar. 19, 2013

(54) PARTICLE BLEND FOR SYNTHESIZING A POROUS STRUCTURE OF THE ALUMINUM TITANATE TYPE

(75) Inventors: Carine Dien-Barataud, Isle (FR); Matthias Schumann, Plan d' Orgon (FR)

(73) Assignee: Saint-Gobain Centre de Recherches et D'etudes Europeen, Courbevoie (FR)

( * ) Notice: Subject to any disclaimer, the term of this patent is extended or adjusted under 35 U.S.C. 154(b) by 0 days.

(21) Appl. No.: 13/002,513

(22) PCT Filed: Jul. 2, 2009

(86) PCT No.: PCT/FR2009/051292
§ 371 (c)(1),
(2), (4) Date: Apr. 18, 2011

(87) PCT Pub. No.: WO2010/001062
PCT Pub. Date: Jan. 7, 2010

(65) Prior Publication Data
US 2011/0190120 A1    Aug. 4, 2011

(30) Foreign Application Priority Data

Jul. 4, 2008 (FR) ..................................... 08 54581

(51) Int. Cl.
| B01J 23/00 | (2006.01) |
| B01J 21/00 | (2006.01) |
| B01J 20/00 | (2006.01) |
| C01G 43/06 | (2006.01) |
| C01F 7/00 | (2006.01) |
| C04B 35/00 | (2006.01) |

(52) U.S. Cl. ........ 502/439; 502/349; 502/350; 502/351; 502/344; 502/415; 501/136; 423/259; 423/600; 423/610

(58) Field of Classification Search .................. 502/349, 502/350, 351, 355, 415, 439; 501/136; 423/259, 423/600, 610
See application file for complete search history.

(56) References Cited

U.S. PATENT DOCUMENTS

| 4,517,069 A * | 5/1985 | Harney et al. ................. 204/284 |
| 5,344,512 A * | 9/1994 | Colomban et al. ......... 156/89.26 |
| 5,830,420 A * | 11/1998 | Borowiec et al. ............... 423/69 |
| 6,531,110 B1 * | 3/2003 | Borowiec et al. ............. 423/610 |
| 7,166,552 B2 * | 1/2007 | Fukuda et al. ................. 501/136 |
| 7,575,792 B2 * | 8/2009 | Fukuda et al. ................. 428/116 |
| 7,691,319 B2 * | 4/2010 | Inoue ............................. 264/630 |
| 7,722,798 B2 * | 5/2010 | Takahashi ..................... 264/630 |
| RE42,352 E * | 5/2011 | Fukuda et al. ................. 501/136 |
| 8,119,234 B2 * | 2/2012 | Backhaus-Ricoult et al. ............................. 428/338 |
| 2001/0006724 A1 * | 7/2001 | Holzschuh .................... 428/336 |
| 2007/0224110 A1 * | 9/2007 | Fukuda et al. ................. 423/598 |
| 2008/0145687 A1 * | 6/2008 | Pretorius ....................... 428/570 |
| 2010/0237007 A1 * | 9/2010 | Merkel et al. ............... 210/510.1 |

FOREIGN PATENT DOCUMENTS

WO    WO 02/081054 A1    10/2002

OTHER PUBLICATIONS

Masayuki Ishitsuka, et al., "Synthesis and Thermal Stability of Aluminum Titanate Solid Solutions", Journal of the American Ceramic Society, XP002512516, Vo. 70, No. 2, Jan. 1, 1987, pp. 69-71.

S. Hoffmann, et al., Melt Synthesis of $Al_2TiO_5$ Containing Composites and Reinvestigation of the Phase Diagram $Al_2O_3$—$TiO_2$ by Powder X-ray Diffraction, Journal of Electroceramics, XP002513010, vol. 16, No. 4, Jul. 1, 2006, pp. 327-330.

H. Wohlfromm et al., "Effect of $ZrSiO_4$ and MgO Additions on Reaction Sintering and Properties of $Al_2TiO_3$-Based Materials", Journal of Materials Science, XP002512515, vol. 25, No. 8, Aug. 1, 1990, pp. 3753-3764.

* cited by examiner

*Primary Examiner* — Cam N. Nguyen

(74) *Attorney, Agent, or Firm* — Oblon, Spivak, McClelland, Maier & Neustadt, L.L.P.

(57) ABSTRACT

The invention relates to a particle blend comprising mainly or consisting of an oxide phase of the pseudo-brookite type comprising at least titanium and aluminum, said blend being obtained from at least two particle size fractions, namely a coarse particle size fraction, the median diameter $d_{50}$ of which is greater than 12 microns, and a fine particle size fraction, the median diameter $d_{50}$ of which is between 0.5 and 3 microns, the mass ratio of said coarse fraction to said fine fraction being between 1.5 and 20, limits inclusive, and the ratio of the median diameter of the coarse fraction to that of the fine fraction being greater than 12.

12 Claims, No Drawings

PARTICLE BLEND FOR SYNTHESIZING A POROUS STRUCTURE OF THE ALUMINUM TITANATE TYPE

CROSS-REFERENCE TO RELATED APPLICATIONS

This application is a National Stage of PCT/FR09/051292 filed Jul. 2, 2009 and claims the benefit of FR 0854581 filed Jul. 4, 2008.

FIELD OF THE INVENTION

The invention relates to a particle blend and to a process using said blend to manufacture a porous structure such as a catalyst support or a particulate filter, the material constituting the filtering and/or active portion of which is based on aluminum titanate. The ceramic material forming the basis of ceramic filters or supports according to the present invention are predominantly formed from oxides of the elements Al and Ti, predominantly in the form of a phase of the aluminum titanate $Al_2TiO_5$ (pseudobrookite) type. The invention also relates to the honeycomb porous structures obtained from such a process, particularly to catalyst supports and/or particulate filters used especially in an exhaust line of a diesel-type internal combustion engine, the properties of which are improved.

In the remainder of the description, the application and the advantages in the specific field of filters or catalyst supports for removing the pollutants contained in the exhaust gases coming from a gasoline or diesel internal combustion engine, to which field the invention relates, will be described. At the present time, structures for decontaminating exhaust gases all have in general a honeycomb structure.

DESCRIPTION OF RELATED ART

As is known, during its use, a particulate filter is subjected to a succession of filtration (soot accumulation) and regeneration (soot removal) phases. During filtration phases, the soot particles emitted by the engine are retained and deposited inside the filter. During regeneration phases, the soot particles are burnt off inside the filter, so as to restore the filtration properties thereof. It will therefore be understood that the mechanical strength properties both at low and high temperature of the material constituting the filter are of paramount importance for such an application. Likewise, the material must have a structure which is sufficiently stable and durable to withstand, especially over the entire lifetime of the vehicle fitted therewith, temperatures which may rise locally up to well above 1000° C., especially if some regeneration phases are poorly controlled.

At the present time, filters and supports are mainly made of a porous ceramic material, especially silicon carbide or cordierite. Silicon carbide filters are for example described in patent applications EP 816 065, EP 1 142 619, EP 1 455 923 or WO 2004/090294 and WO 2004/065088. Such filters make it possible to obtain chemically inert filtering structures of excellent thermal conductivity and having porosity characteristics, particularly average pore size and pore size distribution, which are ideal for the application of filtering soot output by an internal combustion engine. However, some drawbacks specific to this material still remain: a first drawback is due to the somewhat high thermal expansion coefficient of SiC, greater than $3 \times 10^{-6}$ $K^{-1}$, which does not permit large monolithic filters to be manufactured and very often requires the filter to be segmented into several honeycomb elements bonded together using a cement, such as that described in patent application EP 1 455 923. A second drawback, of economic nature, is due to the extremely high firing temperature, typically above 2100° C. for sintering, ensuring a sufficient thermomechanical strength of the honeycomb structures, especially during the successive regeneration phases of the filter. Such temperatures require the installation of special equipment, appreciably increasing the cost of the filter finally obtained.

From another standpoint, although cordierite filters have been known and used for a long time, owing to their low cost, it is known at the present time that problem may arise in such structures, especially during poorly controlled regeneration cycles during which the filter may be locally subjected to temperatures above the melting point of cordierite. The consequences of these hot spots may range from a partial loss of efficiency of the filter to its complete destruction in the severest cases. Furthermore, the chemical inertness of cordierite is insufficient at the temperatures reached during the successive regeneration cycles and consequently it is liable to react with and be corroded by the alkaline and other metals that have accumulated in the structure during the filtration phases, which phenomenon may also be the cause of the rapid deterioration in the properties of the structure.

For example, such drawbacks have been described in the patent application WO 2004/011124 which proposes, to remedy them, a filter based on aluminum titanate (60 to 90 wt %) reinforced with mullite (10 to 40 wt %), the durability of which is improved.

However, the experiments conducted by the Applicant have shown that it is difficult at the present time to guarantee the performance of such a structure based on a porous material of the aluminum titanate type, in particular to control the level of porosity of the porous filtering material finally obtained, while guaranteeing thermal stability and mechanical and thermomechanical strength properties suitable for making it directly usable in an application as a catalyst support or a particulate filter in an automobile exhaust line.

BRIEF SUMMARY OF THE INVENTION

The aim of the present invention is thus to provide a material and its manufacturing process, said material having a controlled porosity and being able to be used as base material for the filtering portion of a filter or for the active portion of a catalyst support.

Said material comprises mainly or consists of an oxide material of the aluminum titanate type and has properties, as described above, enabling it to be advantageously used in the field of the honeycomb porous structures currently used in an automobile exhaust line of the catalyst support or particulate filter type.

DETAILED DESCRIPTION OF THE INVENTION

In its most general form, the present invention relates to a particle blend comprising mainly or consisting of an oxide phase of the pseudo-brookite type comprising at least titanium and aluminum, said blend being obtained from at least two particle size fractions, namely:

a coarse particle size fraction, the median diameter $d_{50}$ of which is greater than 12 microns; and a fine particle size fraction, the median diameter $d_{50}$ of which is between 0.5 and 3 microns, the mass ratio of said coarse fraction to said fine fraction being between 1.5 and 20, limits inclusive, and the ratio of the median diameter of the coarse fraction to that of the fine fraction being greater than 12.

For example, in said particle blend, at least some of the particles comprise a main phase consisting of an oxide phase of the pseudo-brookite type comprising at least titanium and aluminum, and at least one secondary phase, said secondary phase being a glassy phase and/or a phase essentially consisting of titanium oxide $TiO_2$.

Said oxide phase of the pseudo-brookite type may comprise titanium, aluminum and optionally magnesium and/or zirconium in proportions such that the phase of the aluminum titanate type approximately satisfies the formula: $(Al_2TiO_5)_x$ $(MgTi_2O_5)_y(MgTiZrO_5)_z$, where $0.1 \leq x < 1$, $0 < y \leq 0.9$ and $z=1-x-y$.

Typically, in said formula: $0.70 \leq x < 1$ and $0 < y \leq 0.3$, preferably $0.80 \leq x < 1$ and $0 < y \leq 0.2$.

According to one advantageous embodiment, the coarse particle size fraction has a median diameter $d_{50}$ of greater than 15 microns.

For example, the coarse particle size fraction has a median diameter $d_{50}$ of less than 100 microns, preferably less than 80 microns and very preferably less than 50 microns, or even less than 40 microns, or even 38 microns or even 35 microns.

According to a preferred embodiment, the mass ratio of the coarse fraction to the fine fraction is between 1.5 and 5 and especially between 1.5 and 4.

The ratio of the median diameter of the coarse fraction to that of the fine fraction is for example greater than 15. In particular, good results have been obtained when the ratio of the median diameter of the coarse fraction to that of the fine fraction is less than 50, or even less than 45, or even less than 40. For example, said ratio may be between 20 and 25, limits inclusive.

So as not to unnecessarily burden the present description, all the possible combinations according to the invention between the various preferred embodiments characterizing the particle fractions and their blending according to the invention, as described above, will not be reported. However, it is quite obvious that all possible combinations of the initial and/or preferred ranges and values described above may be envisioned and must be considered as being described by the Applicant within the context of the present description (especially two, three or even more combinations).

The invention also relates to a process for manufacturing a catalyst support or a honeycomb particulate filter from a particle blend as described above, comprising the following main steps:
 a) said coarse and fine fractions are blended together;
 b) the particle blend is mixed, in the presence of an organic binder of the methyl cellulose type and optionally a pore former and an amount of water sufficient to obtain plasticity for carrying out step c);
 c) a green honeycomb structure is extruded through a die; and
 d) said structure is fired at a temperature of between 1300° C. and 1800° C.

The invention also relates to a catalyst support that can be obtained by a process as described above, comprising mainly or consisting of an oxide phase of the pseudo-brookite type comprising at least titanium and aluminum.

Finally, the invention relates to a particulate filter, possibly a catalytic particulate filter, that can be obtained by a process as described above, the filtering portion of which comprises mainly or consists of an oxide phase of the pseudo-brookite type comprising at least titanium and aluminum.

According to a first embodiment of the invention, the porous material is obtained from simple oxides, $Al_2O_3$, $TiO_2$ and possibly other oxides of elements that can form the pseudo-brookite structure $Al_2TiO_5$, for example in the form of a solid solution. Such materials are typically magnesium oxide, silicon oxide, zirconium oxide, iron oxide or oxides of other elements. The blend is sintered, that is to say it is heated to a temperature enabling the simple oxides to react so as to form sintered particles comprising at least one main phase having a structure of the $Al_2TiO_5$ type.

Alternatively, it is also possible according to the invention to use, instead of said simple oxides, any precursor of said oxides, for example in the form of carbonates, hydroxides or other organometallics of the above elements. The term "precursor" is understood to mean a material which decomposes into a simple oxide corresponding to a stage often prior to the heat treatment, i.e. at a heating temperature typically below 1000° C., or below 800° C. or even below 500° C. Just as above, the blend of precursors is sintered, i.e. it is heated to a temperature allowing the precursors to react to form particles comprising at least predominantly a phase having a structure of the $Al_2TiO_5$ type.

According to another possible embodiment of the invention, the material according to the invention is synthesized from particles obtained by prior melting of the oxides $Al_2O_3$, $TiO_2$ and optionally MgO, $ZrO_2$, $SiO_2$ or other oxides (or the precursors thereof).

For example, the particles are obtained according to the invention by the fused casting method, which makes it possible to manufacture large quantities with high yields and a very good price/performance ratio.

The successive fused casting steps for the manufacture of the particles are for example as follows:
 a) the raw materials are blended so as to form the starting charge;
 b) the starting charge is melted so as to obtain molten liquid;
 c) said molten liquid is cooled so that the molten liquid has entirely solidified, it being possible for this cooling to take place rapidly, for example in less than 3 minutes; and
 d) optionally, said solid mass is milled so as to obtain a particle blend.

Of course, without departing from the scope of the invention, any other conventional or known process for manufacturing fused cast particles may also be employed, provided that the composition of the starting charge enables particles having a composition in accordance with that of the particles according to the invention to be obtained.

In step b), an electric arc furnace is preferably used, but any known furnace can be envisioned, such as an induction furnace or a plasma furnace, provided that it completely melts the starting charge. The firing is preferably carried out under inert conditions, for example under argon, or under oxidizing conditions, preferably at atmospheric pressure.

In step c), the cooling is preferably but not necessarily rapid, i.e. in such a way that the molten liquid becomes entirely solidified in less than 3 minutes. Preferably, the cooling results from casting in CS molds, as described in the U.S. Pat. No. 3,993,119, or from a quenching operation.

In step d), the solid mass is milled, using conventional techniques, until the size of the particles according to the present invention is obtained.

One process for manufacturing such a structure from an initial particle blend according to the invention is in general the following:

Firstly, the particles obtained by sintering or fused casting as described above are blended. According to the invention, the fused cast particles have been milled in such a way that they have a suitable particle size within the meaning of the present invention. In a manner well known in the field, the manufacturing process typically includes a step of mixing the initial particle blend with an organic binder of the methyl cellulose type and a pore former for example such as: starch, graphite, polyethylene, PMMA, etc. and the progressive addition of water until the plasticity needed to allow the step of extruding the honeycomb structure is obtained.

For example, during the first step, the particle blend is mixed with 1 to 30 wt % of at least one pore-forming agent chosen according to the desired pore size, and then at least one organic plasticizer and/or an organic binder and water are added.

The mixing results in a homogeneous product in the form of a paste. The step of extruding this product through a die of suitable shape makes it possible, using well-known techniques, to obtain honeycomb-shaped monoliths. The process may for example then include a step of drying the monoliths obtained. During the drying step, the green ceramic monoliths obtained are typically dried by microwave drying or by thermal drying, for a time sufficient to bring the non-chemically-bound water content to less than 1 wt %. When it is desired to obtain a particulate filter, the process may further include a step of blocking every other channel at each end of the monolith.

The step of firing the monoliths, the filtering portion of which is based on aluminum titanate, is in principle carried out at a temperature above 1300° C. but not exceeding 1800° C., preferably not exceeding 1750° C. The temperature is adjusted in particular according to the other phases and/or oxides that are present in the porous material. Usually, during the firing step, the monolith structure is heated to a temperature of between 1300° C. and 1600° C. in an atmosphere containing oxygen or an inert gas.

Although one of the advantages of the invention lies in the possibility of obtaining monolithic structures of greatly increased size without the need for segmentation, unlike SiC filters (as described above), according to one embodiment which is not however preferred, the process may optionally include a step of assembling the monoliths into a filtration structure assembled using well-known techniques, for example those described in patent application EP 816 065.

The filtering structure or structure made of porous ceramic material according to the invention is preferably of the honeycomb type. It has a suitable porosity, generally between 20 and 65%, preferably between 30 and 50%, the average pore size being ideally between 10 and 20 microns.

Such filtering structures typically have a central portion comprising a number of adjacent ducts or channels of mutually parallel axes that are separated by walls formed by the porous material.

In a particulate filter, the ducts are closed off by plugs at one or other of their ends so as to define inlet chambers opening onto a gas entry face and outlet chambers opening onto a gas discharge face, in such a way that the gas passes through the porous walls.

The present invention also relates to a filter or to a catalyst support obtained from a structure as defined above and by depositing, preferably by impregnation, at least one active catalytic phase, which is supported or preferably not supported, typically comprising at least one precious metal, such as Pt and/or Rh and/or Pd and optionally an oxide such as $CeO_2$, $ZrO_2$ or $CeO_2$—$ZrO_2$. The catalyst supports also have a honeycomb structure, but the ducts are not closed off by plugs and the catalyst is deposited in the pores of the channels.

The invention and its advantages will be better understood on reading the following non-limiting examples. In the examples, unless otherwise mentioned, all the percentages are given by weight.

EXAMPLES

In all the examples, the percentages are given by weight. Specimens were prepared from the following raw materials:
about 40 wt % of alumina with a purity level greater than 99.5% and a median diameter $d_{50}$ of 90 μm, sold under the reference AR75® by Pechiney;
about 50 wt % $TiO_2$ in rutile form, comprising more than 95% $TiO_2$ and about 1% zirconia and having a median diameter $d_{50}$ of about 120 μm, sold by Europe Minerals;
about 5 wt % of $SiO_2$ with a level of purity greater than 99.5% and a median diameter $d_{50}$ of 208 μm, sold by SIFRACO; and
about 4 wt % of MgO with a purity level greater than 98% and with more than 80% of the particles having a diameter between 0.25 and 1 mm, sold by Nedmag.

The blend of initial reactive oxides was melted in an electric arc furnace, in air, under oxidizing electrical conditions. The fused blend was then cast into a CS mold so as to obtain rapid cooling. The product obtained was milled and screened so as to obtain powders having various particle size fractions. More precisely, the milling and screening were carried out under conditions for finally obtaining four particle size fractions, namely:
a particle size fraction characterized by a median diameter $d_{50}$ of approximately 30 microns, denoted by the term "coarse fraction" according to the present invention;
a particle size fraction characterized by a median diameter $d_{50}$ of approximately 16 microns, denoted by the term "coarse fraction" according to the present invention;
a particle size fraction characterized by a median diameter $d_{50}$ of approximately 1.5 microns, denoted by the term "fine fraction" according to the present invention; and
a particle size fraction characterized by a median diameter $d_{50}$ of approximately 0.7 microns, denoted by the term "fine fraction" according to the present invention.

Within the context of the present description, the median diameter $d_{50}$ denotes the diameter of the particles, measured by sedigraphy, below which 50% by volume of the population lies.

Microprobe analysis showed that all the particles of the fused phase thus obtained had the following composition, in percentages by weight of the oxides:

TABLE 1

| $Al_2O_3$ | $TiO_2$ | MgO | $SiO_2$ | CaO | $Na_2O$ | $K_2O$ | $Fe_2O_3$ | $ZrO_2$ | TOTAL |
|---|---|---|---|---|---|---|---|---|---|
| 40.5 | 48.5 | 3.98 | 4.81 | 0.17 | 0.15 | 0.47 | 0.55 | 0.85 | 100.00 |

The composition and the nature of the phases present within the particles were also analyzed, the results of the analysis being given in Table 2. Based on these results, the percentage by weight of each phase was able to be estimated by calculation. Based on the data obtained, it was also possible to determine, for the main phase AMTZ, the values of x and y corresponding to a general formula of the pseudo-brookite $(Al_2TiO_5)_x(MgTi_2O_5)_y(MgTiZrO_5)_z$ structure, in the form of a solid solution of the $Al_2TiO_5$ type incorporating in particular the elements Mg and Zr.

TABLE 2

|  | AMTZ (main phase) | PS (silicate phase) | P2 (secondary phase) |
|---|---|---|---|
| $Al_2O_3$ | 45.0 | 21.0 | 1.4 |
| $TiO_2$ | 50.1 | 4.9 | 91.7 |
| MgO | 3.9 | 4.2 | 0.1 |
| $SiO_2$ | 0.2 | 60.4 | 0.6 |
| $ZrO_2$ | 0.4 | 1.4 | 6 |
| CaO |  | 2.2 | 0.1 |
| $Na_2O$ |  | 0.9 |  |
| $K_2O$ |  | 5.2 | 0.1 |
| $Fe_2O_3$ | 0.5 |  | 0.2 |
| x (estimated) | 0.82 | — | — |
| y (estimated) | 0.17 | — | — |
| z (estimated) | 0.01 | — | — |
| percentage (estimated) | 86 | 9 | 5 |

In Table 2:
1) The crystalline phases present in the refractory products were characterized by X-ray diffraction. In Table 2, AMTZ indicates a solid solution of the $(Al_2TiO_5)_x(MgTi_2O_5)_y(MgTiZrO_5)_z$ type where $z=1-x-y$, P2 corresponds to a minor second phase and PS indicates the additional presence of a silicate phase;
2) The chemical composition of the various phases, indicated as percentages by weight on the basis of the oxides, was determined by X-ray fluorescence.

To study the characteristics and advantages, in an application as catalyst support and/or particulate filter, of porous structures based on materials obtained by a process according to the invention, and to compare them with those described previously and/or those not meeting the criteria according to the present invention, various specimens were prepared from the fused particle fractions obtained.

Bars of a porous ceramic material were conventionally obtained in the following manner: One or more particle size fractions were mixed with 4% of an organic binder of the methyl cellulose type and 15% by weight of a pore-forming agent. Water was added, mixing until a homogeneous paste was obtained that had a plasticity enabling a specimen in the form of a bar of 8 mm×6 mm cross section and 70 mm in length to be extruded, said bar then being sintered at 1450° C. for 4 hours.

On these specimens, so as to estimate the value of the porous material in a "particulate filter" application, the modulus of rupture MOR, the porosity characteristics and the shrinkage on sintering were measured on the porous bars thus obtained.

The conventional porosity characteristics (overall open porosity and median pore diameter) were measured by the well-known techniques of high-pressure mercury porosimetry using a Micromeritics 9500 porosimeter.

The shrinkage on sintering expresses the dimensional change of the specimen after sintering at 1450° C. More precisely, according to the invention, the term "shrinkage on sintering" is understood to mean the average reduction along each of the two dimensions of the cross section of the material, persistent at low temperature, i.e. at a temperature below 400° C. and especially at room temperature. In Table 4, the value of the shrinkage indicated corresponds to the average of the shrinkage for the two dimensions, expressed as a percentage of the initial dimension of the bar before sintering, for each of said dimensions. This characteristic is extremely important for assessing the feasibility of the process for manufacturing the porous structure. Specifically, a high shrinkage on sintering means that the honeycomb formed from the material would be subject to major difficulties in industrial scale-up, especially for obtaining, with acceptable reproducibility, structures having dimensional characteristics that can be guaranteed with sufficient precision so as to enable them to be used without any difficulty in particular in an automobile exhaust line.

The modulus of rupture (MOR) was determined at room temperature in 3-point bending on the porous bars measuring 60 mm×6 mm×8 mm obtained previously.

All the results obtained are given in Table 4.

The same blends of particle size fractions were also used to obtain honeycomb monoliths by extrusion through a die, the dimensions of the monoliths being given in Table 3:

TABLE 3

| Channel density | 180 cpsi (channels per square inch); 1 inch = 2.54 cm |
|---|---|
| Wall thickness | 350 μm |
| Length | 15.2 cm |
| Cross section | 3.6 cm × 3.6 cm |

The green monoliths obtained were cut and examined for the purpose of checking the uniformity of the distribution of material within the honeycomb extruded structure.

The extrusion facility was also assessed by examining the flow pressure needed to allow extrusion through a die of 2 mm diameter spaghetti of the material.

Depending on the above two parameters (i.e. the uniformity of the distribution of material within the honeycomb extruded structure and the flow pressure for extruding the spaghetti), the possibility (or otherwise) of extruding the particle blend was determined. The results of the blend "extrudability" analysis are also given in Table 4.

TABLE 4

|  | Example | | | | | | | |
|---|---|---|---|---|---|---|---|---|
|  | 1 | 2 | 3 | 4 | 5 | 6 | 7 | 8 |
| % by weight of the $d_{50} = 30$ μm coarse fraction in the blend |  | 100 |  | 66 | 80 | 91 |  | 80 |
| % by weight of the $d_{50} = 16$ μm coarse fraction in the blend | 100 |  | 66 |  |  |  | 66 | 5 |
| % by weight of the $d_{50} = 1.5$ μm fine fraction in the blend |  |  |  | 33 | 20 |  | 33 | 15 |

TABLE 4-continued

| | Example | | | | | | | |
|---|---|---|---|---|---|---|---|---|
| | 1 | 2 | 3 | 4 | 5 | 6 | 7 | 8 |
| % by weight of the $d_{50}$ = 0.7 μm fine fraction in the blend | | | 33 | | | 9 | | |
| Median pore diameter (μm) | 11.4 | 18.6 | 10.9 | 14.5 | 16.2 | 17.8 | 9.8 | 16.4 |
| Porosity (%) | 33.2 | 42.0 | 31.7 | 36.4 | 38.9 | 41.3 | 31.1 | 39.5 |
| Shrinkage of the porous material | 19.2 | | | 13.1 | 13.9 | 14.0 | 16.2 | |
| MOR of the porous rods sintered at 1450° C. (MPa) | | 4.3 | 9.6 | 7.2 | 5.6 | 4.7 | 8.9 | 6.2 |
| Flow pressure (in bar) for extruding the honeycomb | 5.0 | 7.0 | 0.8 | 2.8 | 5.0 | 6.1 | 3.8 | 3.8 |
| Uniformity of the extruded green honeycomb | – | – | +++ | +++ | ++ | + | – | ++ |
| Extrudability | – – | – – | +++ | +++ | ++ | + | – | ++ |
| Coarse fraction/fine fraction $d_{50}$ ratio | – | – | 23 | 20 | 20 | 43 | 11 | 20 |
| Coarse fraction/fine fraction mass ratio | – | – | 2 | 2 | 4 | 10 | 2 | 5 |

In Table 4, examples 1 and 2 are given for comparison. In these two examples, the material was obtained only by an initial blend of a coarse fraction. In such a case, and as indicated in Table 4, it was not possible to extrude porous honeycomb structures acceptably. Furthermore, the MOR values obtained on the bars are low.

Example 7, also given for comparison, shows that forming problems and especially extrudability problems arise when two, coarse and fine, fractions are used but the ratio of the median diameters of the coarse and fine fractions is less than 12.

The results given in Table 3 show that examples 3 to 6 according to the invention result in materials and products in which none of the essential characteristics, for an application as porous catalyst structure and/or filter in an exhaust line, has degraded to the point of making the material difficult or unusable in such an application.

Example 8 illustrates an embodiment in which three particle size fractions are used: a coarse fraction and a fine fraction according to the invention to which an intermediate size fraction was added. In particular, Table 4 shows that only the particle blends according to the invention as defined in the claims hereinbelow make it possible to obtain materials:
 1) which can be easily formed for said application, i.e. can be easily extruded into a honeycomb structure; and
 2) which in the end have combined mechanical strength, porosity and stability (shrinkage) characteristics compatible with said application.

The invention claimed is:

1. A particle blend comprising an oxide phase of the pseudo-brookite type comprising titanium and aluminum, said particle blend comprising
 a coarse particle size fraction of the blend of the oxide phase, the median diameter $d_{50}$ of which is greater than 12 microns; and
 a fine particle size fraction of the blend of the oxide phase, the median diameter $d_{50}$ of which is between 0.5 and 3 microns,
 wherein the mass ratio of said coarse particle size fraction to said fine particle size fraction is from between 1.5 and 20, and the ratio of the median diameter of the coarse fraction to that of the fine fraction is greater than 12.

2. The particle blend as claimed in claim 1, wherein at least some of the particles comprise a main phase consisting of an oxide phase of the pseudo-brookite type comprising titanium and aluminum, and at least one secondary phase, said secondary phase is a glassy phase and/or a phase essentially consisting of titanium oxide $TiO_2$.

3. The particle blend as claimed in claim 1, wherein the oxide phase of the pseudo-brookite type comprises titanium, aluminum and optionally magnesium and/or zirconium in proportions such that the phase of the the pseudo-brookite type satisfies the formula:

$(Al_2TiO_5)_x(MgTi_2O_5)_y(MgTiZrO_5)_z$, where $0.1 \leq x < 1$, $0 < y \leq 0.9$ and $z=1-x-y$.

4. The particle blend as claimed in claim 1, wherein the coarse particle size fraction has a median diameter $d_{50}$ of greater than 15 microns.

5. The particle blend as claimed in claim 1, wherein the coarse particle size fraction has a median diameter $d_{50}$ of less than 100 microns.

6. The particle blend as claimed in claim 1, wherein the mass ratio of the coarse fraction to the fine fraction is between 1.5 and 5.

7. The particle blend as claimed in claim 1, wherein the ratio of the median diameter of the coarse fraction to that of the fine fraction is greater than 15.

8. A process for manufacturing a catalyst support or a honeycomb particulate filter from a particle blend as claimed in claim 1, comprising:
 a) blending said coarse particle size fraction and said fine particle size fraction to form a blend;
 b) mixing the blend, in the presence of an organic binder of the methyl cellulose type and optionally a pore former and an amount of water sufficient to obtain plasticity;
 c) extruding the blend into a green honeycomb structure through a die; and
 d) firing said honeycomb structure at a temperature of between 1300° C. and 1800° C.

9. A catalyst support prepared by a process according to claim 8, comprising an oxide phase of the pseudo-brookite type comprising titanium and aluminum.

10. A particulate filter prepared by a process as claimed in claim 8, comprising-an oxide phase of the pseudo-brookite type comprising titanium and aluminum.

11. A catalyst support prepared by a process according to claim 8, consisting of an oxide phase of the pseudo-brookite type consisting of titanium and aluminum.

12. A particulate filter prepared by a process as claimed in claim 8, the filtering portion of which consists of an oxide phase of the pseudo-brookite type consisting of titanium and aluminum.

* * * * *